United States Patent
Atieh et al.

(10) Patent No.: US 7,620,274 B2
(45) Date of Patent: Nov. 17, 2009

(54) OPTICAL PROTECTION SWITCH AND METHOD FOR OPTICAL PROTECTION SWITCHING

(75) Inventors: Ahmad Atieh, Ottawa (CA); John Mills, Ottawa (CA)

(73) Assignee: BTI Systems Inc., Ottawa, Ontario (CA)

( * ) Notice: Subject to any disclaimer, the term of this patent is extended or adjusted under 35 U.S.C. 154(b) by 457 days.

(21) Appl. No.: 11/705,161

(22) Filed: Feb. 12, 2007

(65) Prior Publication Data

US 2008/0193124 A1   Aug. 14, 2008

(51) Int. Cl.
G02B 6/26 (2006.01)
(52) U.S. Cl. .................. 385/16; 385/15; 385/24; 398/1; 398/2; 398/3
(58) Field of Classification Search .................. 385/15, 385/16, 24; 398/1, 2, 3
See application file for complete search history.

(56) References Cited

U.S. PATENT DOCUMENTS

| | | | |
|---|---|---|---|
| 5,134,621 A | 7/1992 | Marshall | |
| 5,483,340 A | 1/1996 | Webb et al. | |
| 5,533,154 A | 7/1996 | Smith | |
| 5,673,140 A | 9/1997 | Fisher | |
| 5,757,529 A | 5/1998 | Desurvire et al. | |
| 5,828,679 A | 10/1998 | Fisher | |
| 5,857,040 A | 1/1999 | Bigo et al. | |
| 6,259,552 B1 | 7/2001 | Boffi et al. | |
| 6,393,167 B1 | 5/2002 | Davis et al. | |
| 6,577,413 B1 | 6/2003 | Saunders | |
| 6,584,241 B2 | 6/2003 | Davis et al. | |
| 6,624,929 B2 * | 9/2003 | Kim et al. | 359/344 |
| 6,634,813 B2 * | 10/2003 | Hall et al. | 398/213 |
| 6,819,817 B2 | 11/2004 | Kaneko et al. | |
| 6,912,338 B2 | 6/2005 | Sotobayashi et al. | |
| 7,123,401 B2 | 10/2006 | Shahar et al. | |
| 2002/0044727 A1 | 4/2002 | Hung | |
| 2002/0057866 A1 | 5/2002 | Hung | |

FOREIGN PATENT DOCUMENTS

CN   1150412 C   5/2004

OTHER PUBLICATIONS

Lefevre, H.C., "Single-mode fibre fractional wave devices and polarisation controllers", *Electronics Letters*, 16(20):778-780, Sep. 1980.
Ibarra-Escamilla, B. et al., "Fiber optical loop mirror with a symmetrical coupler and a quarter-wave retarder plate in the loop", *Optics Communications*, 242(1-3):191-197, Nov. 2004.
Culshaw, B., "The optical fibre Sagnac interferometer: an overview of its principles and applications", *Measurement Science and Technology*, vol. 17, R1-R16, 2006.
Pottiez, O. et al., "Easily tunable nonlinear optical loop mirror based on polarization asymmetry", *Opt. Express*, 12:3878-3887, 2004.

\* cited by examiner

*Primary Examiner*—Jennifer Doan (57) ABSTRACT

An optical protection switch and a method for optical protection switching are provided. The optical protection switch includes a loop mirror-based optical switch with two circulators and a direction-dependent phase shifter in the loop mirror. The direction-dependent phase shifter introduces phase shifts in counter-propagating optical signals in the loop mirror such that either one of a first optical signal and a second optical signal are switched as an output optical signal. The direction-dependent phase shifter is controlled by a controller which initiates switching from the first optical signal to the second optical signal if a drop in power level is detected in the first optical signal and a corresponding drop in power level is not detected in the second optical signal and vice versa.

23 Claims, 4 Drawing Sheets

OPTICAL PROTECTION SWITCH AND METHOD FOR OPTICAL PROTECTION SWITCHING

FIELD OF THE INVENTION

The invention pertains to the field of optical protection switching.

BACKGROUND OF THE INVENTION

In order to provide a greater level of reliability, optical networks often incorporate some form of redundancy. For example, an optical signal may be transmitted on two separate optical fibers. The redundancy allows communication to continue even if one of the fibers is cut or otherwise made unsuitable for communication.

A transmitter transmits the optical signal on a first optical fiber and a second optical fiber, while a receiver switches between receiving the optical signal on the first optical fiber and receiving the optical signal on the second optical fiber and vice versa. In conventional systems, this switching is generally done by using 2×1 mechanical switches.

While a 2×1 mechanical switch is operable to switch between optical signals received on a first fiber and a second fiber, the 2×1 mechanical switch has no other beneficial features, and can often cause an undesired level of noise and power loss.

SUMMARY OF THE INVENTION

According to one aspect of the present invention, there is provided an optical protection switch comprising: a loop mirror having a first port and a second port; a first circulator operable to couple a first optical signal from a first input port to the first port of the loop mirror and to couple an output optical signal from the first port of the loop mirror to an output port; a second circulator operable to couple a second optical signal from a second input port to the second port of the loop mirror and to couple a third optical signal from the second port of the loop mirror to a drop port; a direction-dependent phase shifter in the loop mirror operable in a first state and a second state; the protection switch operable to switch the first optical signal as the output optical signal and to switch the second optical signal as the third optical signal when the direction-dependent phase shifter is in the first state; the protection switch operable in a second state to switch the first optical signal as the third optical signal and to switch the second optical signal as the output optical signal when the direction-dependent phase shifter is in the second state; and a controller operable to switch the direction-dependent phase shifter between the first state and the second state based on a first power level of the first optical signal and a second power level of the second optical signal.

In some embodiments, the second optical signal is identical to the first optical signal.

In some embodiments, the loop mirror comprises a 2×2 optical coupler connected to an optical loop.

In some embodiments, the direction-dependent phase shifter is located along the optical loop away from a midpoint of the optical loop.

In some embodiments, the direction-dependent phase shifter comprises a polarization controller.

In some embodiments, the polarization controller comprises a quarter-wave plate.

In some embodiments, the optical loop comprises a polarization-maintaining fiber.

In some embodiments, the optical loop comprises a bi-directional optical amplifier and the loop mirror reduces amplified spontaneous emissions of the bi-directional optical amplifier.

In some embodiments, the 2×2 optical coupler comprises a 3 dB fiber coupler.

In some embodiments, the optical loop comprises an optical fiber.

In some embodiments, the controller switches the direction-dependent phase shifter from the first state to the second state when the second power level is greater than the first power level by at least 3 dB and switches the direction-dependent phase shifter from the second state to the first state when the first power level is greater than the second power level by at least 3 dB.

In some embodiments, the first state of the direction-dependent phase shifter and the second state of the direction-dependent phase shifter are adjusted based on the third power level.

In some embodiments, the optical protection switch further comprises: a first photodiode operable to determine the first power level of first optical signal; a second photodiode operable to determine the second power level of the second optical signal; and a third photodiode operable to determine the third power level of the third optical signal.

In some embodiments, the direction-dependent phase shifter comprises any one of a polarization controller, a liquid crystal component, a bulk optics component with different materials that introduce phase shifting, a piezoelectric element, a refractive index control element, and a nonlinearity in a fiber that causes a self-phase modulation effect.

In some embodiments, the optical protection switch further comprises: a first polarization controller connected between the first circulator and the first port of the loop mirror and operable to control the polarization of the first optical signal and the output signal; and a second polarization controller connected between the second circulator and the second port of the loop mirror and operable to control the polarization of the second optical signal and the third optical signal.

In some embodiments, in the first state the direction-dependent phase shifter introduces phase shifts in counter-propagating optical signals in the loop mirror which differ any one of zero and an even multiple of $\pi$ and in the second state the direction-dependent phase shifter introduces phase shifts in counter-propagating optical signals in the loop mirror which differ by an odd multiple of $\pi$.

In some embodiments, the optical protection switch further comprises: a first variable optical attenuator (VOA) operable to selectively block the first optical signal from reaching the first circulator and hence from being coupled to the first port of the loop mirror; and a second VOA operable to selectively block the second optical signal from reaching the second circulator and hence from being coupled to the second port of the loop mirror.

In some embodiments, the first VOA is closed in the first state and is open in the second state and the second VOA is open in the first state and is closed in the second state.

According to another aspect of the present invention, there is provided a method for optical protection switching in an optical protection switch comprising a loop mirror having a first port and a second port, a direction-dependent phase shifter in the loop mirror, a first circulator operable to couple a first optical signal from a first input port to the first port of the loop mirror and to couple an output optical signal from the first port of the loop mirror to an output port, and a second circulator operable to couple a second optical signal from a second input port to the second port of the loop mirror and to couple a third optical signal from the second port of the loop mirror to a drop port, the method comprising: determining a first power level of the first optical signal, a second power level of the second optical signal and a third power level of the third optical signal; determining which one of the first optical signal and the second optical signal is to be switched as the output optical signal based on the first power level and the second power level; upon determining that the first optical signal is to be switched as the output optical signal, controlling the direction-dependent phase shifter based on the third power level and the second power level such that the first optical signal is switched as the output optical signal; and upon determining that the second optical signal is to be switched as the output optical signal, controlling the direction-dependent phase shifter based on the third power level and the first power level such that the second optical signal is switched as the output optical signal.

In some embodiments, the second optical signal is identical to the first optical signal.

In some embodiments, controlling the direction-dependent phase shifter comprises controlling the direction-dependent phase shifter to introduce phase shifts in counter-propagating optical signal in the loop mirror, such that a difference between the phase shifts of any one of zero and an even multiple of $\pi$ causes the first optical signal to be switched as the output signal and a difference between the phase shifts of an odd multiple of $\pi$ causes the second optical signal to be switched as the output signal.

In some embodiments, determining which one of the first optical signal and the second optical signal is to be switched as the output optical signal based on the first power level and the second power level comprises: determining the first optical signal is to be switched as the output signal when the first power level is greater than the second power level by a predetermined amount; and determining the second optical signal is to be switched as the output signal when the second power level is greater than the first power level by the predetermined amount.

In some embodiments, the predetermined amount is 3 dB.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which.

DETAILED DESCRIPTION

Various methods and optical protection switches to perform all-optical protection switching are provided. The optical protection switches include a pair of circulators, a loop mirror and a direction-dependent phase shifter in the loop mirror to perform 2×1 switching in order to switch between a first optical signal and a second optical signal.

One of the advantages to using a loop mirror with a direction-dependent phase shifter is that, as described below, as a signal is switched through the loop mirror, amplified spontaneous emissions and other uncorrelated sources of noise that accompany the signal are reduced due to their random nature. Fiber optic loop mirrors and their operation are described in Ibarra-Escamilla, B.; Kuzin, E. A.; Pottiez, O.; Haus, J. W.; Gutierrez-Zainos, F.; Grajales-Coutiño, R.; Zaca-Moran, P., "Fiber optical loop mirror with a symmetrical coupler and a quarter-wave retarder plate in the loop", Optics Communications, Volume 242, Issue 1-3, p. 191-197 (November 2004); Culshaw, B., "The optical fibre Sagnac interferometer: an overview of its principles and applications", Measurement Science and Technology 17 R1-R16 (2006); and O. Pottiez, E. Kuzin, B. Ibarra-Escamilla, J. Camas-Anzueto, and F. Gutiérrez-Zainos, "Easily tunable nonlinear optical loop mirror based on polarization asymmetry," Opt. Express 12, 3878-3887 (2004), which are hereby incorporated by reference in their entirety.

Figure 1:
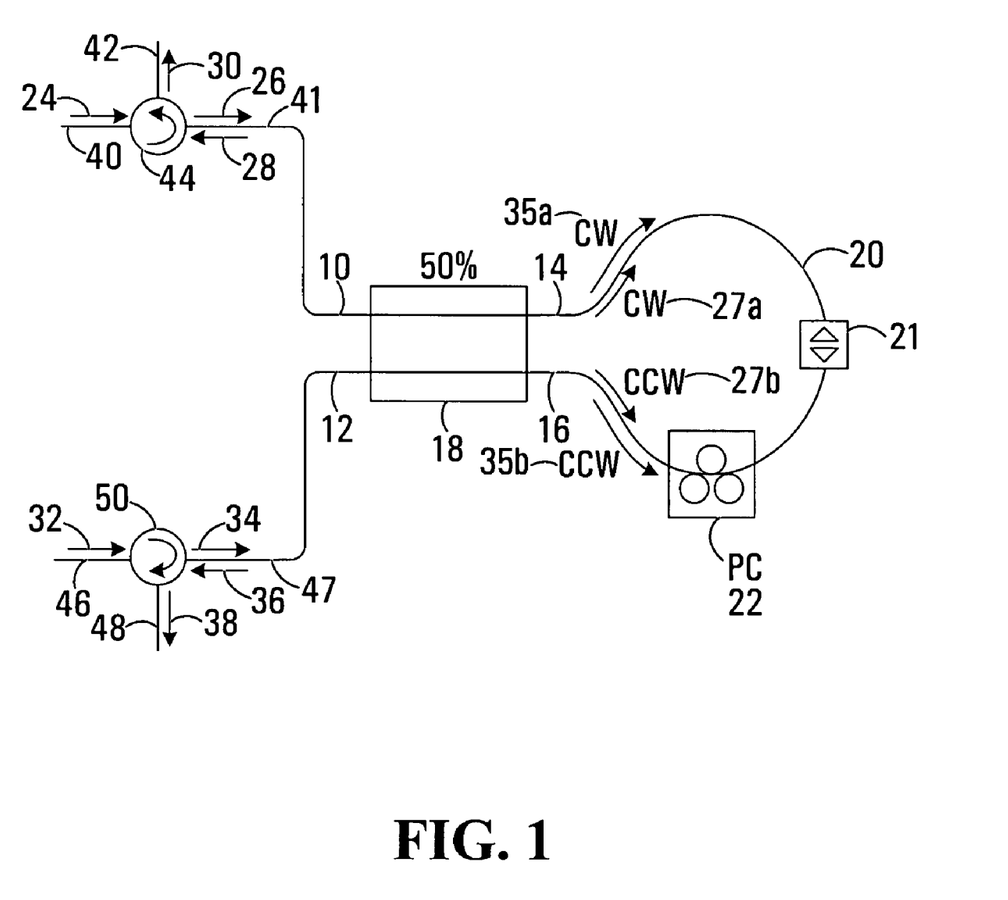
FIG. 1 is a block diagram of an optical loop mirror-based optical switch in accordance with an embodiment of the invention.

FIG. 1 is a block diagram of an example of an optical loop mirror-based optical switch in accordance with an embodiment of the invention. The loop mirror-based optical switch includes a first circulator 44, a second circulator 50, a 2×2 optical coupler 18, an optical loop 20, a bi-directional optical amplifier 21 and a direction-dependent phase shifter, which is shown as a polarization controller 22 in FIG. 1. The first circulator 44 has a first port 40, a second port 41 that is connected to a first port 10 of the 2×2 optical coupler 18, and a third port 42. The second circulator 50 has a first port 46, a second port 47 that is connected to a second port 12 of the 2×2 optical coupler 18, and a third port 48. In addition to the first port 10 and the second port 12, the 2×2 optical coupler 18 has a third port 14 and a fourth port 16. The third port 14 and the fourth port 16 are respectively connected to a first end and a second end of the optical loop 20. The bi-directional optical amplifier 21 is located along the optical loop 20 such that a first port of the optical amplifier 21 is connected to the third port 14 of the 2×2 optical coupler 18 and a second port of the optical amplifier 21 is connected to a first port of the polarization controller 22. The polarization controller 22 has a second port that is connected to the fourth port 16 of the 2×2 optical coupler 18.

A circulator operates by passing or "circulating" an optical signal received on one of its ports to its next sequential port. For example, in a three-port circulator, such as the first circulator 44 and the second circulator 50 shown in FIG. 1, the circulator is operable to: receive a first optical signal on its first port and pass that first optical signal to its second port; receive a second optical signal on its second port and pass that second optical signal to its third port. While circulators have been used in the example embodiments provided, more generally any optical device may be used that is operable to pass an optical signal received on one of its ports to its next sequential port, as described above.

A 2×2 optical coupler is a bi-directional optical component, which couples optical signals received on its first port and its second port to both its third port and its fourth port and couples optical signals received on its third port and its fourth port to both its first port and its second port.

A direction-dependent phase shifter, such as the polarization controller 22, is a bi-directional optical device that causes a phase shift in an optical signal that passes through the direction-dependent phase shifter, such that the phase shift depends on the direction in which the optical signal passes through the direction-dependent phase shifter. For example, a direction-dependent phase shifter may introduce a phase shift of π/2 in an optical signal passing through the direction-dependent phase shifter in one direction and −π/2 in an optical signal passing through the direction-dependent phase shifter in the opposite direction, such that the direction-dependent phase shifter introduces a phase difference of π between counter-propagating optical signals. The operation of a polarization controller is described further in Lefevre, H. C., "Single-mode fibre fractional wave devices and polarisation controllers", Electronics Letters Volume 16, Issue 20, p. 778-780 (September 1980), which is hereby incorporated by reference in its entirety.

In the implementation shown in FIG. 1, the polarization controller 22 is located along the optical loop 20 at a point closer to the fourth port 16 than to the third port 14 of the 2×2 optical coupler 18. In general, a direction-dependent phase shifter may be located at any point along the optical loop 20.

In some embodiments, the polarization controller 22 is implemented as a quarter-wave plate.

In some embodiments, the optical loop 20 is implemented with polarization-maintaining fiber.

Although the bi-directional optical amplifier 21 is shown as being located along the optical loop 20 between the third port 14 of the 2×2 optical coupler 18 and the first port of the polarization controller 22 in FIG. 1, in some embodiments, the bi-directional amplifier 21 is located along the optical loop 20 between the second port of the polarization controller 22 and the fourth port 16 of the 2×2 optical coupler 18.

In operation, an optical signal 24 received at the first port 40 of the first circulator 44 is circulated as an optical signal 26 to the first port 10 of the 2×2 optical coupler 18. The 2×2 optical coupler 18 couples the optical signal 26 to both the third port 14 and the fourth port 16 of the 2×2 optical coupler 18 so as to produce two counter-propagating optical signals in the optical loop 20, namely a clockwise (CW) signal 27a and a counter clockwise (CCW) signal 27b. An optical signal 32 received at the first port 46 of the second circulator 50 is circulated as an optical signal 34 to the second port 12 of the 2×2 optical coupler 18. The 2×2 optical coupler 18 couples the optical signal 34 to both the third port 14 and the fourth port 16 of the 2×2 optical coupler 18 so as to produce a CW signal 35a and a CCW signal 35b in the optical loop 20.

In FIG. 1, the 2×2 optical coupler 18 is a 3 dB optical coupler, which means that 50% of the optical signal power of the optical signal 26 is coupled to the third port 14 to produce CW signal 27a and 50% of the optical signal power of the optical signal 26 is coupled to the fourth port 16 to produce CCW signal 27b. The same is true for the optical signal 34 and the corresponding CW signal 35a and the corresponding CCW signal 35b.

The 2×2 optical coupler 18 introduces a phase offset of π/2 between the CW signal 27a and the CCW signal 27b, and also introduces a phase offset of π/2 between the CW signal 35a and the CCW signal 35b. If the optical signal 26 received at the first port 10 of the 2×2 optical coupler 18 and the optical signal 34 received at the second port 12 of the 2×2 optical coupler 18 are equal to $S_1$ and $S_2$ respectively, then the CW signals 27a, 35a and the CCW signals 27b, 35b are given by:

$$CW \text{ signal } 27a = \frac{1}{\sqrt{2}} S_1 \quad (1)$$

$$CCW \text{ signal } 27b = \frac{1}{\sqrt{2}} S_1 e^{j\pi/2} \quad (2)$$

$$CW \text{ signal } 35a = \frac{1}{\sqrt{2}} S_2 e^{j\pi/2} \quad (3)$$

$$CCW \text{ signal } 35b = \frac{1}{\sqrt{2}} S_2 \quad (4)$$

The $$\frac{1}{\sqrt{2}}$$

term in equations (1) to (4) comes from the fact that the 2×2 optical coupler 18 is a 3 dB optical coupler, and hence 50% of the optical power received at the first port 10 of the 2×2 optical coupler 18 is coupled into the CW signal 27a and 50% is coupled into the CCW signal 27b, and 50% of the optical power received at the second port 12 of the 2×2 optical coupler 18 is coupled into the CW signal 35a and 50% is coupled into the CCW signal 35b.

The CW signals 27a, 35a will travel around the optical loop 20 and will arrive at the fourth port 16, while the CCW signals 27b, 35b will travel around the optical loop 20 and will arrive at the third port 14. As the CW signals 27a, 35a and the CCW signals 27b, 35b travel around the optical loop 20, the CW signals 27a, 35a acquire an additional phase shift (SHIFT_CW) and the CCW signals 27b, 35b acquire an additional phase shift (SHIFT_CCW). The additional phase shifts SHIFT_CW and SHIFT_CCW are offset because of direction-dependent phase shifts introduced by the polarization controller 22.

The CW signals 27a, 35a and the CCW signals 27b, 35b also pass through the bi-directional optical amplifier 21 as they travel around the optical loop 20. The bi-directional optical amplifier 21 amplifies both the CW signals 27a, 35a and the CCW signals 27b, 35b by an amplification factor of A. Of course, the bi-directional optical amplifier 21 will also produce unwanted amplified spontaneous emissions (ASE). However, as discussed below the operation of the loop mirror reduces the ASE contribution by 3 dB.

With the amplification A of the bi-directional optical amplifier 21 and the additional phase shifts SHIFT_CW, SHIFT_CCW resulting from propagation around the optical loop 20 and from the direction-dependent phase shifts introduced by the polarization controller 22, the CW signals 27a, 35a and the CCW signals 27b, 35b, which arrive at the fourth port 16 and the third port 14, respectively, are given by:

$$CW \text{ signal } 27a = \frac{A}{\sqrt{2}} S_1 e^{j\text{SHIFT\_CW}} \quad (5)$$

$$CCW \text{ signal } 27b = \frac{A}{\sqrt{2}} S_1 e^{j\pi/2} e^{j\text{SHIFT\_CCW}} \quad (6)$$

$$CW \text{ signal } 35a = \frac{A}{\sqrt{2}} S_2 e^{j\pi/2} e^{j\text{SHIFT\_CW}} \quad (7)$$

-continued $$CCW \text{ signal } 35b = \frac{A}{\sqrt{2}} S_2 e^{j\text{SHIFT\_CCW}} \qquad (8)$$

The 2×2 optical coupler 18 couples the CW signals 27a, 35a received at its fourth port 16 and the CCW signals 27b, 35b received at its third port 14 to both of its first port 10 and its second port 12, which produces optical signal 28 and optical signal 36 respectively. The optical signals 28 and 36 are given by:

$$\text{optical signal } 28 = \frac{1}{\sqrt{2}}(CW \text{ signal } 27a + CW \text{ signal } 35a)e^{j\pi/2} + \qquad (9)$$
$$\frac{1}{\sqrt{2}} CCW \text{ signal } 27b + \frac{1}{\sqrt{2}} CCW \text{ signal } 35b$$

$$\text{optical signal } 36 = \frac{1}{\sqrt{2}} CW \text{ signal } 27a + \frac{1}{\sqrt{2}} CW \text{ signal } 35a + \qquad (10)$$
$$\frac{1}{\sqrt{2}}(CCW \text{ signal } 27b + CCW \text{ signal } 35b)e^{j\pi/2}$$

Substituting, equations (5) to (8) into (9) and (10) gives:

$$\text{optical signal } 28 = \frac{A}{2} S_1 e^{j\text{SHIFT\_CW}} e^{j\pi/2} + \qquad (11)$$
$$\frac{A}{2} S_2 e^{j\pi} e^{j\text{SHIFT\_CW}} + \frac{A}{2} S_1 e^{j\pi/2} e^{j\text{SHIFT\_CCW}} + \frac{A}{2} S_2 e^{j\text{SHIFT\_CCW}}$$

$$\text{optical signal } 36 = \frac{A}{2} S_1 e^{j\text{SHIFT\_CW}} + \frac{A}{2} S_2 e^{j\pi/2} e^{j\text{SHIFT\_CW}} + \qquad (12)$$
$$\frac{A}{2} S_1 e^{j\pi} e^{j\text{SHIFT\_CCW}} + \frac{A}{2} S_2 e^{j\text{SHIFT\_CCW}} e^{j\pi/2}$$

Using the following equation:

$$e^{j\pi} = -1 \qquad (13)$$

equations (11) and (12) can be further simplified to:

$$\text{optical signal } 28 = \frac{A}{2} S_1 e^{j\pi/2}(e^{j\text{SHIFT\_CW}} + e^{j\text{SHIFT\_CCW}}) + \qquad (14)$$
$$\frac{A}{2} S_2(e^{j\text{SHIFT\_CCW}} - e^{j\text{SHIFT\_CW}})$$

$$\text{optical signal } 36 = \frac{A}{2} S_1(e^{j\text{SHIFT\_CW}} - e^{j\text{SHIFT\_CCW}}) + \qquad (15)$$
$$\frac{A}{2} S_2 e^{j\pi/2}(e^{j\text{SHIFT\_CW}} + e^{j\text{SHIFT\_CCW}})$$

If the polarization controller 22 does not introduce a direction-dependent phase shift in the CW signals 27a, 35a and the CCW signals 27b, 35b, i.e. SHIFT_CW=SHIFT_CCW, then (14) and (15) simplify to:

$$\text{optical signal } 28 = AS_1 e^{j\pi/2} \qquad (16)$$

$$\text{optical signal } 36 = AS_2 e^{j\pi/2} \qquad (17)$$

Therefore, if the polarization controller 22 does not introduce a direction-dependent phase shift in the CW signals 27a, 35a and the CCW signals 27b, 35b, the loop mirror-based switch simply receives the optical signal 26 and the optical signal 34 at ports 10 and 12 respectively, amplifies them and loops them back to ports 10 and 12 with a phase shift as optical signals 28 and 36 respectively. The optical signal 28 is an amplified version of the optical signal 26 with a phase shift of π/2 and the optical signal 36 is an amplified version of the optical signal 34 with a phase shift of π/2. A similar result is provided if the polarization controller 22 introduces direction-dependent phase shifts such that SHIFT_CW and SHIFT_CCW differ by an even multiple of π, such as 2π, 4π or 6π, although the phase difference between the optical signal 28 and the optical signal 26 and the phase difference between the optical signal 36 and the optical signal 34 will depend on the values of the SHIFT_CW and the SHIFT_CCW and not only on the difference between them.

Alternatively, if the polarization controller 22 introduces direction-dependent phase shifts such that the phase shifts SHIFT_CW and SHIFT_CCW differ by π, then (14) and (15) simplify to:

$$\text{optical signal } 28 = AS_2 e^{j\pi/2} \qquad (18)$$

$$\text{optical signal } 36 = AS_1 e^{j\pi/2} \qquad (19)$$

Therefore, if the polarization controller 22 introduces direction-dependent phase shifts such that there is a phase difference of π between the CW signals 27a, 35a and the CCW signals 27b, 35b, the loop mirror-based switch receives the optical signal 26 and the optical signal 34 at ports 10 and 12 respectively, amplifies them and switches them back to ports 12 and 10 with a phase shift as optical signals 36 and 28 respectively. A similar result is obtained from introducing direction-dependent phase shifts with the polarization controller 22 such that the phase shifts SHIFT_CW and SHIFT_CCW differ by any odd multiple of π, such as 3π, 5π or 7π, although the phase difference between the optical signal 28 and the optical signal 34 and the phase difference between the optical signal 36 and the optical signal 26 will depend on the values of the SHIFT_CW and the SHIFT_CCW and not only on the difference between them.

The first circulator 44 receives the optical signal 28 and circulates it to its third port 42 as optical signal 30. The second circulator 50 receives the optical signal 36 and circulates it to its third port 48 as optical signal 38.

The phase shifts SHIFT_CW and SHIFT_CCW introduced by the polarization controller 22 cause the CW signals 27a, 35a and the CCW signals 27b, 35b to either interfere constructively or destructively in the 2×2 optical coupler 18, which leads to the switching functionality described above. Because noise is a random process, noise and other random components of the CW signals 27a, 35a and the CCW signals 27b, 35b will be largely uncorrelated and hence will not tend to add constructively at the 2×2 optical coupler 18, therefore random and/or uncorrelated components such as ASE noise will be reduced by the optical loop mirror-based switch shown in FIG. 1. Because the optical coupler 18 is a 3 dB coupler, the ASE noise caused by the bi-directional optical amplifier 21 will be reduced by 3 dB. Furthermore, the use of the bi-directional optical amplifier in the optical loop 20 allows both optical signals 26 and 34 to be amplified by a single optical amplifier, which also potentially reduces the cost of the switch.

From the foregoing, it is clear that the optical loop switch implementation shown in FIG. 1 is operable to receive optical signals $S_1$ and $S_2$ at the first port 40 of the first circulator 44 and at the first port 46 of the second circulator 50 respectively and in a first state of the polarization controller 22 switch the optical signal $S_1$ to the third port 42 of the first circulator 44 and switch the optical signal $S_2$ to the third port 48 of the second circulator 50 and in a second state of the polarization controller 22 switch the optical signal $S_1$ to the third port 48 of the second circulator 50 and switch the optical signal $S_2$ to the third port 42 of the first circulator 44. In this manner, the third port 42 of the first circulator 44 operates as an output port, while the third port 48 of the second circulator 50 operates as a drop port, or vice versa, such that one of the optical signals $S_1$ or $S_2$ is switched to the output port, while the other one of the optical signals $S_2$ or $S_1$ is switched to the drop port, which simply functions as a sink for the unwanted one of S1 and S2, although the signal may find other uses as detailed below.

In some embodiments, the optical loop 20 is an optical fiber.

The bi-directional optical amplifier 21 may be any type of bi-directional optical amplifier. For example, a bi-directional erbium doped fiber amplifier.

In some embodiments, the bi-directional optical amplifier 21 is not included.

Although a polarization controller 22 is shown in FIG. 1, more generally any type of direction-dependent phase shifter, for example, a crystal polarization element, may be used to adjust the phase of optical signals circulated in the optical loop 20.

In FIG. 1, the 2×2 optical coupler 18 is shown as a 3 dB optical coupler, which couples 50% of signal power received at its first port 10 and its second port 12 to each of its third port 14 and its fourth port 16. More generally, any type of 2×2 optical coupler may be used, provided that the coupling between ports is substantially equal. For example, a signal received at the first port is equally coupled to the third port and the fourth port.

In some embodiments, a first polarization controller is provided between the second port of the first circulator 44 and the first port 10 of the 2×2 optical coupler 18 and a second polarization controller is provided between the second port of the second circulator 50 and the second port 12 of the 2×2 optical coupler 18. These polarization controllers are used to control the polarization of the optical signals 26, 28, 34 and 36. These polarization controllers could be used in implementations in which the loop mirror is constructed from polarization-maintaining fiber. In these implementations, the first polarization controller and the second polarization controller would align the polarization of signals 26 and 34 to match the polarization of the polarization-maintaining fiber for coupling and splitting purposes.

Figure 2:
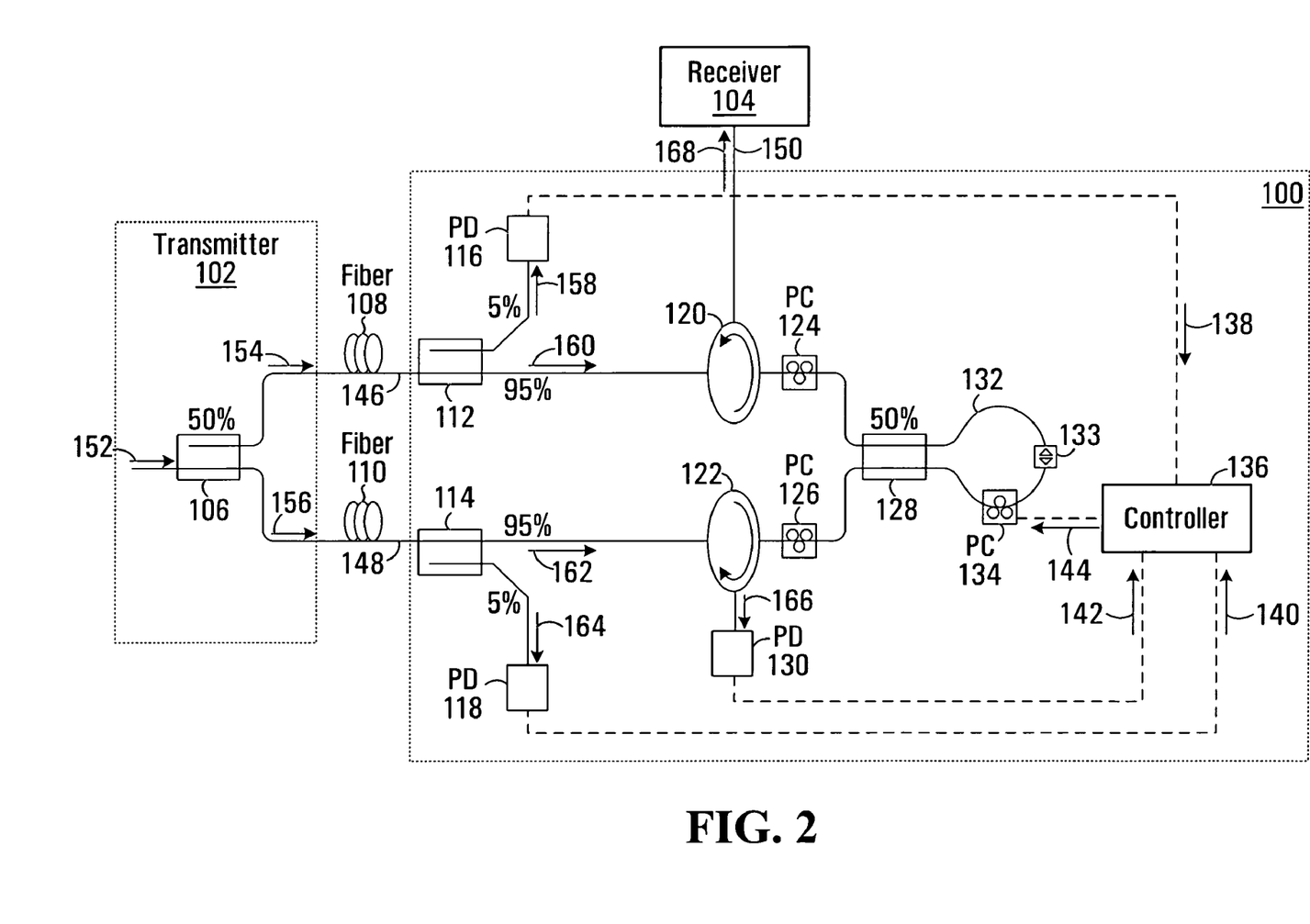
FIG. 2 is a block diagram of an optical transmitter and an optical receiver with an optical protection switch in accordance with an embodiment of the invention.

FIG. 2 shows an example implementation of an optical protection switch 100 between a transmitter 102 and a receiver 104. The optical protection switch 100 includes an optical loop mirror-based optical switch similar to the optical loop mirror-based optical switch shown in FIG. 1. Only the portion of the transmitter 102 that is relevant to producing redundancy protected optical signals is shown in FIG. 2. Specifically, the transmitter 102 includes an optical splitter 106, which has an input, a first output and a second output. The first output of the optical splitter 106 is connected to a first output of the transmitter 102 and the second output of the optical splitter 106 is connected to a second output of the transmitter 102. The first output of the transmitter 102 is connected to a first input 146 of the optical protection switch 100 by a first optical fiber 108. The second output of the transmitter 102 is connected to a second input 148 of the optical protection switch 100 by a second optical fiber 110. The first input 146 and the second input 148 of the optical protection switch 100 are connected to an input of a first optical tap 112 and an input of a second optical tap 114 respectively. The first optical tap 112 and the second optical tap 114 each has a first input connected to a first port of a first circulator 120 and a first port of a second circulator 122 respectively. The first optical tap 112 and the second optical tap 114 each has a second output connected to an input of a first photodiode (PD) 116 and an input of a second PD 118 respectively. The first PD 116 and the second PD 118 each has an output connected to a respective input of a controller 136. The first circulator 120 has a second port that is connected to an input of a first polarization controller 124 and a third port that is connected to an output 150 of the protection switch 100, which is connected to an input of a receiver 104. The second circulator 122 has a second port connected to an input of a second polarization controller 126 and a third port connected to an input of a third PD 130. The third PD 130 has an output connected to an input of the controller 136. The first polarization controller 124 and the second polarization controller 126 each has an output connected to a first port and a second port of an 2×2 optical coupler 128 respectively. The 2×2 optical coupler 128 has a third port and a fourth port respectively connected to a first end and a second end of an optical loop 132. The optical loop 132 has a bi-directional optical amplifier 133 provided along its length. The optical loop 132 also has a third polarization controller 134 provided along its length at a point closer to the second end than to the first end. The third polarization controller 134 has an input connected to an output of the controller 136.

In operation, an optical signal 152 is split into optical signal 154 and optical signal 156 by the optical splitter 106. The optical splitter 106 is shown as a 3 dB fiber optical coupler and therefore 50% of the optical power of the optical signal 152 is coupled into the optical signal 154 and 50% is passed into the optical signal 156. The optical signal 154 and the optical signal 156 are output on the first output and the second output of the transmitter 102 and travel through the first optical fiber 108 and the second optical fiber 110 respectively.

The optical signal 154 and the optical signal 156 are received at the first input 146 and the second input 148 of the optical protection switch 100 respectively. The first optical tap 112 passes a first portion of the optical signal 154 off to the first port of the first circulator 120 as an optical signal 160 and taps a second portion of the optical signal 154 off to the first PD 116 as an optical signal 158. The second optical tap 114 passes a first portion of the optical signal 156 off to the first port of the second circulator 122 as an optical signal 162 and taps a second portion of the optical signal 156 off to the second PD 118 as an optical signal 164. The tap ratios of the first optical tap 112 and the second optical tap 114, which are the ratio between the optical signal 160 and the optical signal 158 and the ratio between the optical signal 162 and the optical signal 164 respectively, are an implementation specific detail. In general, the majority of the signal power of the optical signals 154 and 156 is passed on to the first circulator 120 and the second circulator 122 respectively, while only a minority of the signal power of the optical signals 154 and 156 is tapped off to the first PD 116 and the second PD 118 respectively. For example, in the implementation shown in FIG. 2 the tap ratios of the first optical tap 112 and the second optical tap 114 are shown to be 95/5.

The first PD 116 and the second PD 118 measure at least the optical signal power of the optical signal 158 and the optical signal power of the optical signal 164 respectively. The first PD 116 and the second PD 118 report these measurements to the controller 136 via measurement signals 138 and 140 respectively.

The first circulator 120 and the second circulator 122 circulate the optical signal 160 and the optical signal 162 from their first ports to their second ports respectively. The first polarization controller 124 controls the polarization of optical signals travelling between the second port of the first circulator 120 and the first port of the 2×2 optical coupler 128. The second polarization controller 126 controls the polarization of optical signals travelling between the second port of the second circulator 122 and the second port of the 2×2 optical coupler 128. As discussed above, with regard to FIG. 1, the first polarization controller 124 and the second polarization controller 126 are used to align the optical signals 160 and 162 with the polarization of the optical loop 132 in those implementations in which the optical loop 132 is implemented with a polarization-maintaining fiber.

After the polarizations of the optical signal 160 and the optical signal 162 are adjusted by the first polarization controller 124 and the second polarization controller 126 respectively, the optical signal 160 and the optical signal 162 are applied to the first port and the second port of the 2×2 optical coupler 128 respectively.

The 2×2 optical coupler 128 is shown as a 3 dB optical fiber optical coupler and therefore 50% of the optical signal powers of the optical signals 160 and 162 are coupled to the third port of the 2×2 optical coupler 128 and 50% of the optical signal powers of the optical signals 160 and 162 are coupled to the fourth port of the 2×2 optical coupler 128, which produces CW and CCW optical signals in the optical loop 132.

As described above with regard to FIG. 1, the bi-directional optical amplifier 133 amplifies the counter propagating signals resulting from both optical signal 160 and optical signal 162 and CW and CCW phase shifts introduced by the third polarization controller 134 provide for switching either one of the optical signal 160 or the optical signal 162 to the third port 150 of the first circulator 120 and hence to the receiver 104 as an output optical signal 168, while the other optical signal is switched to the third port of the second circulator 122 and hence to the third photodiode 130 as an optical signal 166. The third photodiode 130 measures at least the optical signal power of the optical signal 166 and reports this measurement to the controller 136 via measurement signal 142.

In some embodiments, the controller 136 monitors the measurement signals 138 and 140 in order to decide which one of the optical signals 160 and 162 should be switched to the receiver 104. The criteria for switching between the optical signal 160 and the optical signal 162 is an implementations specific detail. For example, in some embodiments, if the optical protection switch is currently switching the optical signal 160 to the receiver 104 and the optical signal power measurements of the first PD 116 and the second PD 118 indicate that the power level of the optical signal 162 is significantly higher, for example 3 dB higher, than the power level of the optical signal 160, the controller 136 will adjust the polarization controller 134 in order to switch the optical signal 162 to the receiver 104 rather than the optical signal 160. The controller 136 controls the polarization controller 134 via the control signal 144.

The controller 136 monitors the measurement signal 142 from the third PD 130 in order to fine tune the polarization controller 134 in order to ensure complete switching, i.e. ensure that the optical signal that is to be switched to the receiver 104 is completely switched to the receiver 104 and the optical signal that is not to be switched to the receiver 104 is completely switched to the third PD 130. In this manner the controller 136 operates as a feedback controller for the polarization controller 134 in order to ensure that the phase difference between the counter-propagating optical signals in the optical loop 132 is the desired value, for example an even multiple of $\pi$ such as 0, $2\pi$ or $4\pi$ when the optical signal 160 is to be switched as the output, and an odd multiple of $\pi$ such as $\pi$, $3\pi$ or $5\pi$ when the optical signal 162 is to be switched as the output. For example, assuming that signal 160 is to be switched to receiver 104, signal 162 should then be completely switched to the third photodiode 130. In order to accomplish this, the controller 136 will adjust the polarization controller 134 such that the third PD 130 measures a power level that corresponds to a power level measured by the second PD 118 taking into account the insertion losses of the second circulator 122 and the optical coupler 128 and the gain of the bi-directional optical amplifier 133.

In another example, if the fiber 108 is cut and the optical signal 160 lost, the optical protection switch 100 will switch the optical signal 162 to the receiver 104. In this case, with the loss of the optical signal 160, the first PD 116 indicates no signal is present, i.e. a zero power level, and therefore the controller 136 adjusts the third polarization controller 134 such that the third photodiode 130 also measures a zero power level, indicating that the optical signal 162 has been completely switched to the receiver 104.

From the functionality described above, it is clear that the optical protective switch 100 is operable to protect against communication breaks due to fiber damage by receiving an optical signal on a first input 146 and a redundant optical signal on a second input 148 and selectively switching between the optical signal and the redundant optical signal based on a measurement of the optical powers of the optical signal and the redundant optical signal in order to automatically switch to the redundant signal if the optical signal is interrupted and vice versa. The optical protection switch 100 has the added advantage that the optical loop mirror-based switch reduces ASE noise and other noise as described above with regard to FIG. 1.

While the optical splitter 106 is shown as a 3 dB fiber splitter in FIG. 2, more generally the optical splitter 106 may be any type of optical splitter that is capable of splitting an optical signal into two equal optical signals.

In FIG. 2, the first optical tap 112 and the second optical tap 114 are shown as 95/5 coupled optical fiber taps, more generally any type of optical tap may be used that is capable of splitting an optical signal into a first optical signal and a second optical signal with a specific power ratio.

In some embodiments, the first polarization controller 124 and the second polarization controller 126 are omitted.

While a polarization controller 134 has been used to offset the phase shifts SHIFT_CW and SHIFT_CCW in the optical loop 132 in FIG. 2, more generally any type of direction-dependent phase shifter may be used. For example, a liquid crystal component, bulk optics components with different materials that introduce phase shifting, piezoelectric elements, a refractive index control element, or a nonlinearity in a fiber such as a self-phase modulation effect may be used to realize a direction-dependent phase shift.

In FIG. 2, only the measurement signals 138, 140 and 142 and the control signal 144 are electrical signals. All of the other signals shown in FIG. 2 are optical signals.

In some embodiments, the controller 136 is implemented as an application specific integrated circuit (ASIC) or in a logic device such as a field programmable gate array (FPGA) or a programmable logic device (PLD). In general, the controller might be implemented as hardware, software, firmware or combinations thereof, which are capable of implementing control logic.

Figure 3:
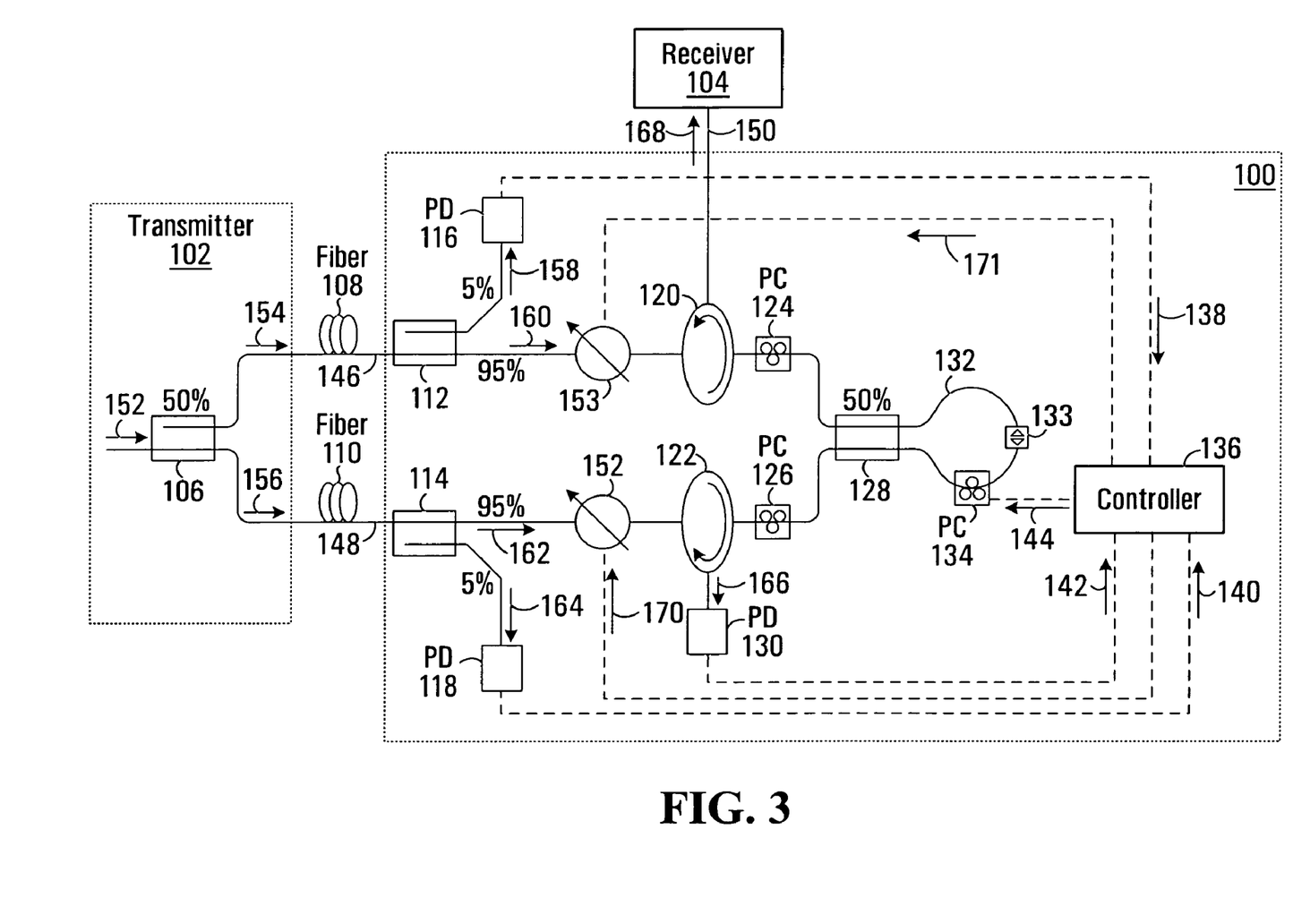
FIG. 3 is a block diagram of an optical transmitter and an optical receiver with an optical protection switch in accordance with an embodiment of the invention.

FIG. 3 shows a block diagram of a transmitter 102, a receiver 104 and a optical protection switch 100 that is identical to the optical protection switch 100 shown in FIG. 2 except for the addition of a first variable optical attenuator (VOA) 153 between the first optical tap 112 and the first circulator 120 and a second VOA 152 between the second optical tap 114 and the second circulator 122. The VOAs 152 and 153 have control inputs that are connected to control outputs of the controller 136 in order to receive control signals 170 and 171 respectively.

In operation, the VOAs 152 and 153 are operable to selectively block the optical signals 162 and 160, respectively, from reaching the first ports of the second circulator 122 and the first circulator 120, respectively, and hence from reaching the second port and the first port of the 2×2 optical coupler 128 respectively. The VOA 152 is normally open (high attenuation) to block the optical signal 162 when the VOA 153 is closed (low attenuation) to allow the optical signal 160 to be switched to the receiver 104. Conversely, when the VOA 152 is closed (low attenuation) to allow the optical signal 162 to be switched to the receiver 104, the VOA 153 is normally open (high attenuation) to block the optical signal 160. Selectively blocking the optical signals 160 and 162 prevents the optical signals 160 and 162 from entering the loop 132, which is important when chirped or non-ideal signals are transmitted by the transmitter 102. Non-ideal or chirped signals may not be correctly switched by the optical protection switch 100 due to differences in dispersion or noise levels caused by the different signal paths through the first optical fiber 108 and the second optical fiber 148.

The controller 136 monitors the measurement signal 140 from the second PD 118 in order to monitor the optical signal 164 and hence the optical signal 162. The controller 136 also monitors the measurement signal 138 from the first PD 116 in order to monitor the optical signal 158 and hence the optical signal 160.

In the event that the controller 136 determines that it is necessary to change from switching the optical signal 160 to the receiver 104 to switching the optical signal 162 to the receiver 104, the control signal 170 is adjusted so that the VOA 152 is closed (low attenuation) to allow the optical signal 162 to pass and the control signal 171 is adjusted so that the VOA 153 is open (high attenuation) to block the optical signal 160.

Conversely, In the event that the controller 136 determines that it is necessary to change from switching the optical signal 162 to the receiver 104 to switching the optical signal 160 to the receiver 104, the control signal 171 is adjusted so that the VOA 153 is closed (low attenuation) to allow the optical signal 160 to pass and the control signal 170 is adjusted so that the VOA 152 is open (high attenuation) to block the optical signal 162. The operation of the optical protection switch 100 shown in FIG. 3 is otherwise identical to the operation of the optical protection switch 100 shown in FIG. 2, which is described in detail above.

An example of a method for optical protection switching in an optical protection switch, which includes a loop mirror with a phase shifter, a first circulator operable to couple a first optical signal to the loop mirror and to couple an output optical signal from the loop mirror, and a second circulator operable to couple a second optical signal to the loop mirror and to couple a third optical signal from the loop mirror, will now be described with reference to FIG. 4. The method begins at step 4-1, in which a first power level of the first optical signal, a second power level of the second optical signal and a third power level of the third optical signal are determined. In step 4-2, it is determined which one of the first optical signal and the second optical signals is to be switched as the output optical signal based on the first power level and the second power level. In step 4-3, the direction-dependent phase shifter is controlled based on the third power level such that the determined one of the first optical signal and the second optical signal is switched as the output optical signal and the other optical signal is switched as the third optical signal.

Figure 4:
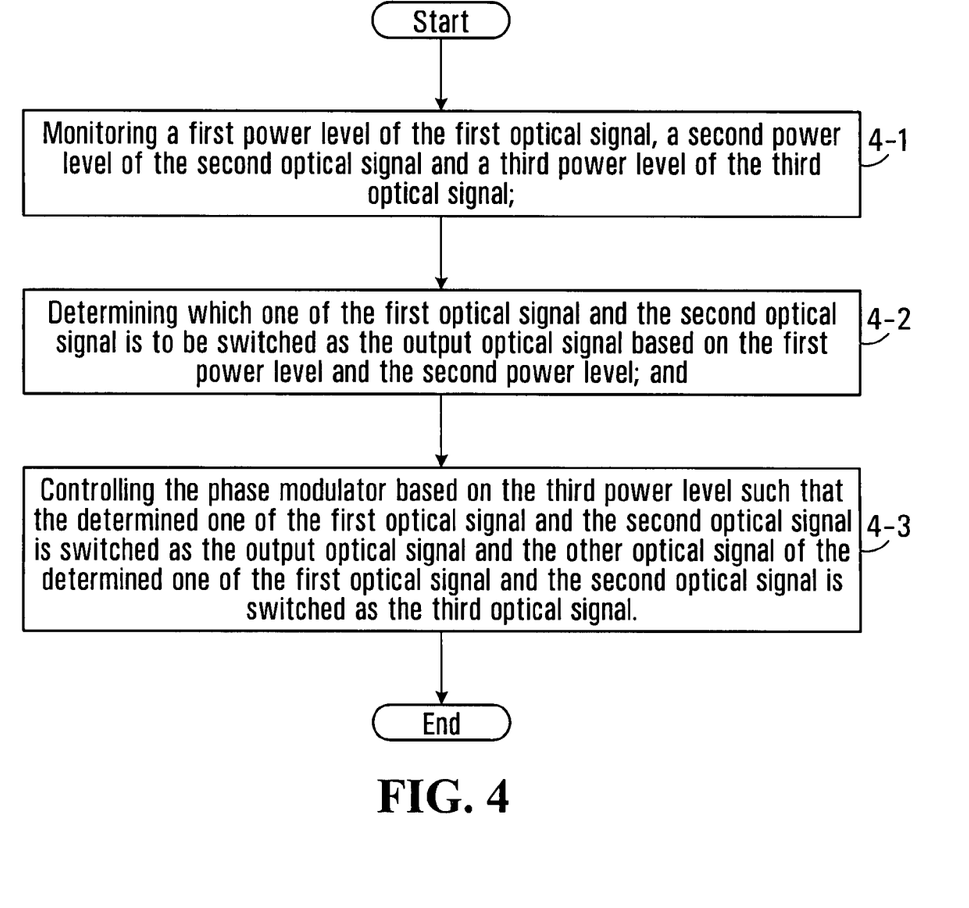
FIG. 4 is a flow chart of a method for optical protection switching in accordance with an embodiment of the invention.

The flow chart shown in FIG. 4, of the example method for optical protection switching, is merely exemplary. The steps of the methods may be re-ordered and/or steps may be added or removed. For example, rather than determining the third power level of the third optical signal in step 4-1, in some embodiments the third power level of the third optical signal is determined concurrently with the adjustment of the direction-dependent phase shifter in step 4-3.

What has been described is merely illustrative of the application of the principles of the invention. Other arrangements and methods can be implemented by those skilled in the art without departing from the spirit and scope of the present invention.

The invention claimed is:

1. An optical protection switch comprising:
a loop mirror having a first port and a second port;
a first circulator operable to couple a first optical signal from a first input port to the first port of the loop mirror and to couple an output optical signal from the first port of the loop mirror to an output port;
a second circulator operable to couple a second optical signal from a second input port to the second port of the loop mirror and to couple a third optical signal from the second port of the loop mirror to a drop port;
a direction-dependent phase shifter in the loop mirror operable in a first state and a second state;
the protection switch operable to switch the first optical signal as the output optical signal and to switch the second optical signal as the third optical signal when the direction-dependent phase shifter is in the first state;
the protection switch operable in a second state to switch the first optical signal as the third optical signal and to switch the second optical signal as the output optical signal when the direction-dependent phase shifter is in the second state; and
a controller operable to switch the direction-dependent phase shifter between the first state and the second state based on a first power level of the first optical signal and a second power level of the second optical signal.

2. The optical protection switch of claim 1, wherein the second optical signal is the same as the first optical signal.

3. The optical protection switch of claim 1, wherein the loop mirror comprises a 2×2 optical coupler connected to an optical loop.

4. The optical protection switch of claim 3, wherein the direction-dependent phase shifter is located along the optical loop away from a midpoint of the optical loop.

5. The optical protection switch of claim 4, wherein the direction-dependent phase shifter comprises a polarization controller.

6. The optical protection switch of claim 5, wherein the polarization controller comprises a quarter-wave plate.

7. The optical protection switch of claim 6, wherein the optical loop comprises a polarization-maintaining fiber.

8. The optical protection switch of claim 3, wherein the optical loop comprises a bi-directional optical amplifier and the loop mirror reduces amplified spontaneous emissions of the bi-directional optical amplifier in the output optical signal.

9. The optical protection switch of claim 8, wherein the 2×2 optical coupler comprises a 3 dB fiber coupler.

10. The optical protection switch of claim 9, wherein the optical loop comprises an optical fiber.

11. The optical protection switch of claim 10, wherein the controller switches the direction-dependent phase shifter from the first state to the second state when the second power level is greater than the first power level by at least 3 dB and switches the direction-dependent phase shifter from the second state to the first state when the first power level is greater than the second power level by at least 3 dB.

12. The optical protection switch of claim 11, wherein the first state of the direction-dependent phase shifter is adjusted based on the third power level and the second power level and the second state of the direction-dependent phase shifter is adjusted based on the third power level and the first power level.

13. The optical protection switch of claim 12, further comprising:
   a first photodiode operable to determine the first power level of first optical signal;
   a second photodiode operable to determine the second power level of the second optical signal; and
   a third photodiode operable to determine the third power level of the third optical signal.

14. The optical protection switch of claim 13, wherein the direction-dependent phase shifter comprises any one of a polarization controller, a liquid crystal component, a bulk optics component with different materials that introduce phase shifting, a piezoelectric element, a refractive index control element, and a nonlinearity in a fiber that causes a self-phase modulation effect.

15. The optical protection switch of claim 1, further comprising:
   a first polarization controller connected between the first circulator and the first port of the loop mirror and operable to control the polarization of the first optical signal and the output signal; and
   a second polarization controller connected between the second circulator and the second port of the loop mirror and operable to control the polarization of the second optical signal and the third optical signal.

16. The optical protection switch of claim 1, wherein in the first state the direction-dependent phase shifter introduces phase shifts in counter-propagating optical signals in the loop mirror which differ by any one of zero and an even multiple of $\pi$ and in the second state the direction-dependent phase shifter introduces phase shifts in counter-propagating optical signals in the loop mirror which differ by an odd multiple of $\pi$.

17. The optical protection switch of claim 1, further comprising:
   a first variable optical attenuator (VOA) operable to selectively block the first optical signal from reaching the first circulator and hence from being coupled to the first port of the loop mirror; and
   a second VOA operable to selectively block the second optical signal from reaching the second circulator and hence from being coupled to the second port of the loop mirror.

18. The optical protection switch of claim 17, wherein the first VOA is closed in the first state and is open in the second state and the second VOA is open in the first state and is closed in the second state.

19. A method for optical protection switching comprising:
   coupling a first optical signal to a first port of a loop mirror;
   coupling a second optical signal to a second port of the loop mirror;
   coupling an output optical signal from the first port of the loop mirror to an output port;
   coupling a third optical signal from the second port of the loop mirror to a drop port;
   determining a first power level of the first optical signal, a second power level of the second optical signal and a third power level of the third optical signal;
   determining which one of the first optical signal and the second optical signal is to be switched as the output optical signal based on the first power level and the second power level;
   upon determining that the first optical signal is to be switched as the output optical signal, controlling a direction-dependent phase shifter in the loop mirror based on the third power level and the second power level such that the first optical signal is switched as the output optical signal; and
   upon determining that the second optical signal is to be switched as the output optical signal, controlling the direction-dependent phase shifter based on the third power level and the first power level such that the second optical signal is switched as the output optical signal.

20. The method of claim 19, wherein the second optical signal is the same as the first optical signal.

21. The method of claim 20, wherein controlling the direction-dependent phase shifter comprises controlling the direction-dependent phase shifter to introduce phase shifts in counter-propagating optical signal in the loop mirror, such that a difference between the phase shifts of any one of zero and an even multiple of $\pi$ causes the first optical signal to be switched as the output signal and a difference between the phase shifts of an odd multiple of $\pi$ causes the second optical signal to be switched as the output signal.

22. The method of claim 21, wherein determining which one of the first optical signal and the second optical signal is to be switched as the output optical signal based on the first power level and the second power level comprises:
   determining the first optical signal is to be switched as the output signal when the first power level is greater than the second power level by a predetermined amount; and
   determining the second optical signal is to be switched as the output signal when the second power level is greater than the first power level by the predetermined amount.

23. The method of claim 22, wherein the predetermined amount is 3 dB.

* * * * *